(12) United States Patent
Tao

(10) Patent No.: US 11,483,911 B2
(45) Date of Patent: Oct. 25, 2022

(54) DOUBLE ENDED RETROFIT LIGHT EMITTING DIODE, LED, BASED LIGHTING DEVICE FOR PREVENTING AN EXCESS OF LEAKAGE CURRENT DURING INSTALLATION OF SAID LIGHTING DEVICE, AS WELL AS A CORRESPONDING METHOD

(71) Applicant: SIGNIFY HOLDING B.V., Eindhoven (NL)

(72) Inventor: Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/291,292

(22) PCT Filed: Oct. 28, 2019

(86) PCT No.: PCT/EP2019/079344
§ 371 (c)(1),
(2) Date: May 5, 2021

(87) PCT Pub. No.: WO2020/094438
PCT Pub. Date: May 14, 2020

(65) Prior Publication Data
US 2022/0007481 A1 Jan. 6, 2022

(30) Foreign Application Priority Data

Nov. 8, 2018 (EP) ...................................... 18205203

(51) Int. Cl.
*H05B 45/34* (2020.01)
*H05B 45/50* (2022.01)
(Continued)

(52) U.S. Cl.
CPC .......... *H05B 45/50* (2020.01); *H05B 45/345* (2020.01); *H05B 45/357* (2020.01)

(58) Field of Classification Search
CPC ...... H05B 45/10; H05B 45/30; H05B 45/345; H05B 45/357; H05B 45/50; H05B 47/00
See application file for complete search history.

(56) References Cited

U.S. PATENT DOCUMENTS 10,117,302 B1 10/2018 Lo
2012/0242241 A1 9/2012 Schmacht
(Continued)

FOREIGN PATENT DOCUMENTS

| EP | 2503235 A1 | 9/2012 |
| EP | 3089556 A1 | 11/2016 |
| WO | 2014115010 A1 | 7/2014 |

*Primary Examiner* — Jimmy T Vu

(57) ABSTRACT

A double ended retrofit Light Emitting Diode (LED) based lighting device for preventing an excess of leakage current during installation of said lighting device, said lighting device comprising: —an LED load arranged for emitting light; —an LED driver arranged for receiving an Alternating Current (AC) mains voltage between at least two terminals and for driving said LED load by providing an LED output current to said LED load, and a Direct Current (DC) Voltage to said LED load; —an under-voltage protection circuit, arranged for measuring said DC voltage and for providing a high ohmic return path between said at least two terminals when said measured voltage is lower than a predetermined threshold.

13 Claims, 5 Drawing Sheets

(51) Int. Cl.
  *H05B 45/345* (2020.01)
  *H05B 45/357* (2020.01)

(56) References Cited

U.S. PATENT DOCUMENTS

2017/0257926 A1   9/2017  Tao
2019/0170336 A1*  6/2019  Sun ........................ H05B 45/37
2019/0338936 A1* 11/2019  Sun ........................ F21V 25/04

* cited by examiner

DOUBLE ENDED RETROFIT LIGHT EMITTING DIODE, LED, BASED LIGHTING DEVICE FOR PREVENTING AN EXCESS OF LEAKAGE CURRENT DURING INSTALLATION OF SAID LIGHTING DEVICE, AS WELL AS A CORRESPONDING METHOD

CROSS-REFERENCE TO PRIOR APPLICATIONS

This application is the U.S. National Phase application under 35 U.S.C. § 371 of International Application No. PCT/EP2019/079344, filed on Oct. 28, 2019, which claims the benefit of European Patent Application No. 18205203.5, filed on Nov. 8, 2018. These applications are hereby incorporated by reference herein.

TECHNICAL FIELD

The present disclosure generally relates to the field of lighting equipment and more specifically to a retrofit Light Emitting Diode, LED, tube with protective measures in order to limit the possibility of leakage current during installation of the LED tube.

BACKGROUND

Fluorescent TL tubes are inherently safe because the gas inside the tube first has to be ignited before there is a conductive path between the two ends of the tube. This safety is necessary when the tube is being installed into a fixture, while the lamp sockets are energized. In the situation, for example, when one end of the tube is inserted to the socket and energized and the other end is not, the pins on the free end shall not have hazardous live voltage.

With gas filled fluorescent tubes, this is not problem. However, when using retrofit Light Emitting Diode, LED, tubes, TLEDs, there is a conductive path between the two ends of the tube. When the pins are touched by a human the internal LED driver tends to conduct a current and starts operating, which usually exceeds a safety limit and cause a shock hazard.

The problem may be solved, for example, by galvanically isolating one side of the TLED from the mains. But in such a solution, the glow starter of the tube must be replaced by a short circuit in order to get the lamp working. Another known solution to such a problem is to employ a single ended input scheme for a TLED. However, such a tube is dependent on the direction in which the TLED is installed and the person installing the TLED should be aware of this. Furthermore, a single ended TLED is only popular in certain regions of the world. A single ended TLED may be converted to function as a double ended TLED, but additional circuitry or elements are needed to be added which increase the complexity and cost of the TLED. This is not desirable.

Another commercially available TLED is the double ended TLED, wherein the TLED can be installed in any physical orientation. Such a configuration exposes the installer to a risk of an electrical shock caused by the leakage current when a person installing the tube comes into contact with one of the pins during installation. A known solution is to install an additional electrical safety switch inside the TLED that prevents the flowing of a current before the TLED is properly installed. Such a solution also involves the additional elements and therefore increases the cost of the TLED.

Therefore, a solution that ensures safety and at the same time does not increase the cost of the device is desirable.

SUMMARY

It would be advantageous to achieve a retrofit Light Emitting Diode, LED, lighting device for preventing an excess of leakage current. It would also be desirable to achieve a corresponding method.

To better address one or more of these concerns, in a first aspect of the present disclosure, there is provided a double ended retrofit Light Emitting Diode, LED, based lighting device for preventing an excess of leakage current during installation of said lighting device. The lighting device comprising:

an LED load arranged for emitting light;
an LED driver arranged for receiving an Alternating Current, AC, mains voltage between at least two terminals and for driving said LED load by providing an LED output current to said LED load, and a Direct Current, DC, Voltage to said LED load;
an under-voltage protection circuit, arranged for measuring said DC voltage and for providing a high ohmic return path between said at least two terminals when said measured voltage is lower than a predetermined threshold.

It was one of the insights of the inventors that retrofit LED lighting device should provide for a high ohmic return path when the input voltage drops. This is an indication for a person touching one of the terminals, and thereby inducing the voltage drop. The person would then be exposed to leakage currents that could potential be harmful for the person itself.

The under-voltage protection circuit may be implemented in digital logic or using analogue electronica. Typically, analogue electronica is preferred due to the speed at which the under-voltage protection circuit is able to intervene and low cost.

The inventors have found that a LED driver in a retrofit LED lighting device is typically arranged to operate in a certain input range while maintaining a relatively constant output current using, for example, a feedback loop. When the input voltage further drops, the circuit may lose regulation and the output current starts to decrease as well. When the voltage drops even further, the circuit may stop working at all.

Based on the choice of the control scheme for the under-voltage protection circuit and the components used within the retrofit LED lighting device, the LED driver is able to operate down to 130V or even lower while being designed for 220-240 Vac input. Such a LED lighting device may then become unsafe when the terminals are touched because the LED lighting device may still work at such reduced input voltage, which causes high leakage current through the human body.

The under-voltage protection circuit may then intervene and may simply make sure that there is not electrical connection between the terminals, or at least a high ohmic path between the terminals to ensure that no unsafe situations may occur with the retrofit LED lighting device.

As mentioned above, the main situation in which an unsafe situation can occur is related to installation of the double ended retrofit LED lighting device. During installation, two terminals may be connected to the mains input voltage, while two other terminals of the retrofit LED lighting device are still out in the open. A high voltage may, however, stand across these two other terminals which could be harmful for a person.

The under-voltage protection circuit is thus arranged to measure the DC voltage and for providing a high ohmic return path between the at least two terminals when the measured voltage is lower than a predetermined threshold. It is noted that the DC voltage is measured as the DC voltage reflects, i.e. is a measure for, the amplitude of the AC input voltage.

In an example, the LED driver is arranged to provide a constant LED output current to said LED load when said supply voltage is between an upper limit and a lower limit, wherein said predetermined threshold for said under-voltage protection circuit is lower than said lower limit.

Such a lower predetermined threshold is, for example, 20% lower than said lower limit.

In a further example, the retrofit LED based lighting device further comprises a switch, wherein said switch is connected such that a return path is established between said at least two terminals when said switch is in an ON state, and such that a return path is interrupted between said at least two terminals when said switch is in an OFF state, wherein said under-voltage protection circuit is arranged for switching said switch to said OFF state when said measured voltage is lower than said predetermined threshold.

In other words, the switch may be placed in series with the remaining electronics in the retrofit LED lighting device. The switch may be a Metal Oxide Semiconductor, MOS, Field Effect Transistor, FET.

In another example, the lighting device comprises four terminals for receiving said AC mains voltage, wherein two of said four terminals are provided at a first end face of said lighting device, and wherein another two of said four terminals are provided at a second end face of said lighting device, said second end face being opposite to said first end face.

Typically, a double ended retrofit LED lighting device, such as a tube, has four terminals. Two of those are provided at one end face of the lighting device, and two of those are provided at another end face of the lighting device. Double ended entails that it does not matter how the lighting device is placed in its corresponding socket.

It is not uncommon for an installation person to first connect two terminals at the first end face to the socket, and to then tilt the lighting device such that the other two terminals, at the other end face, connect to the socket. During the tilting process, a safety issue may arise with the terminals that are not yet connected to the socket. A person physically touching those non-connected terminals may be exposed to a safety issue due to leakage current flowing via the human body to earth.

The present disclosure is arranged to measure the presence of a high impedance, such as a human body, by measuring a drop in the voltage. The under-voltage protection circuit will then create a high impedance return path to ensure that the leakage current is, at least, reduced.

In a second aspect, there is provided a method of preventing leakage current during installation of a double ended retrofit Light Emitting Diode, LED, based lighting device in accordance with any of the examples as provide above, wherein said method comprising the steps of:

measuring, by an under-voltage detection element, said DC voltage;
determining, by said under-voltage detection element, that said measured DC voltage is below a pre-determined threshold;
providing, by said under-voltage detection element, a high ohmic path between said at least two terminals for preventing said leakage current.

The advantages of the first aspect of the disclosure being a double ended retrofit LED lighting device, are also inherently a part of the second aspect of the disclosure.

In an example, the LED driver is arranged to provide a constant LED output current to said LED load when said supply voltage is between an upper limit and a lower limit, wherein said predetermined threshold for said under-voltage protection circuit is lower than said lower limit.

In a further example, the lower predetermined threshold is 20% lower than said lower limit.

In another example, the retrofit LED based lighting device further comprises a switch, wherein said switch is connected such that a return path is established between said at least two terminals when said switch is in an ON state, and such that a return path is interrupted between said at least two terminals when said switch is in an OFF state, wherein said step of providing further comprises:

providing, by said under-voltage protection circuit, a high ohmic path by switching said switch to said OFF state when said measured voltage is lower than said predetermined threshold.

In a further example, the switch is a Metal Oxide Semiconductor, MOS, Field Effect Transistor, FET.

In an example, the lighting device comprises four terminals for receiving said AC mains voltage, wherein two of said four terminals are provided at a first end face of said lighting device, and wherein another two of said four terminals are provided at a second end face of said lighting device, said second end face being opposite to said first end face.

In a third aspect, there is provided a computer program product comprising a computer readable medium having instructions which, when implemented by a double ended retrofit Light Emitting Diode, LED, based lighting device, cause said LED lighting device to implement a method in accordance with any of the previous examples.

These and other aspects of the invention will be apparent from and elucidated with reference to the embodiment(s) described hereinafter.

DETAILED DESCRIPTION

A detailed description of the drawings and figures are presented. It is noted that a same reference number in different figures indicates a similar component or a same function of various components.

Figure 1:
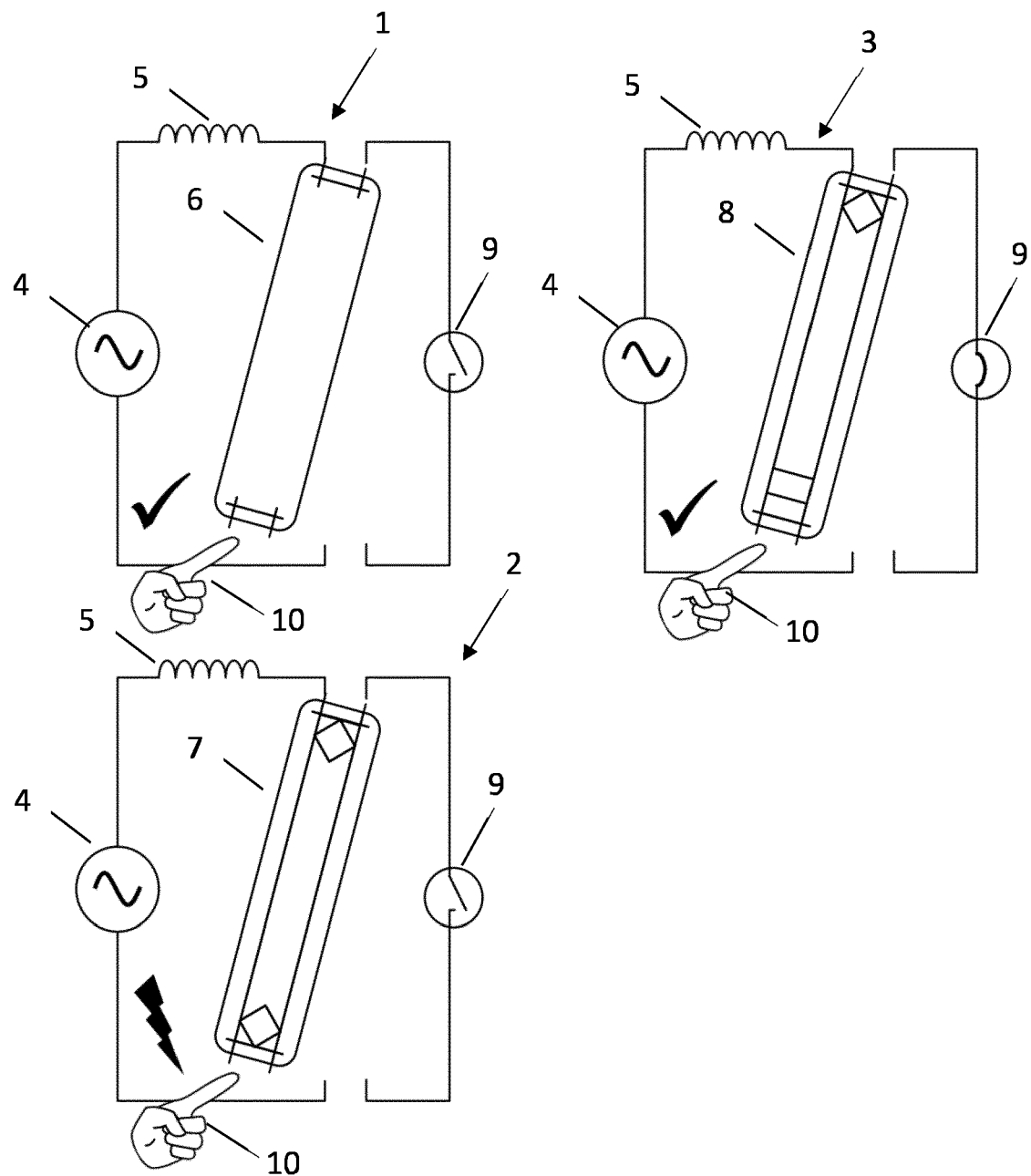
FIG. 1 illustrates possible scenarios during installation of different kinds of tubes.

FIG. 1 illustrates possible scenarios during installation of different kinds of tubes. Fluorescent TL tubes, as indicated by reference numeral 1, are inherently safe because the gas inside the tube 6 first has to be ignited before there is a conductive path between the two ends of the tube. The tube 6 is connected to an Alternating Current, AC, mains voltage power supply 4 such as the ones commonly found in domestic, or any other type of, buildings. The tube 6 or the fixture into which the tube 6 is installed may comprise of additional elements such as a ballast 5 and a jumper or a starter element 9.

This safety is necessary when the tube 6 is being installed into a fixture while the lamp sockets are energized, i.e. the mains voltage is present. In the situation when one end of the tube is inserted to the socket and energized and the other end not, the pins of the free end shall not have hazardous voltage.

With gas filled fluorescent tubes, such as 6, this is not a problem, but when using LED retrofit lamps 7 there is a conductive path between the two ends of the tube as indicated in reference numeral 2. When the pins are touched by a human 10, the internal LED driver tends to conduct a current, which usually exceeds a safety limit and causes a shock hazard.

A known solution to this problem is to apply the mains input only at one side of the tube, as indicated by reference numeral 3. The other side is thus galvanically isolated from the mains 4. In this case there is no conductive path between the two sides of the tube, but the glow starter must be replaced by a short 9 to get the lamp 8 working.

Figure 2:
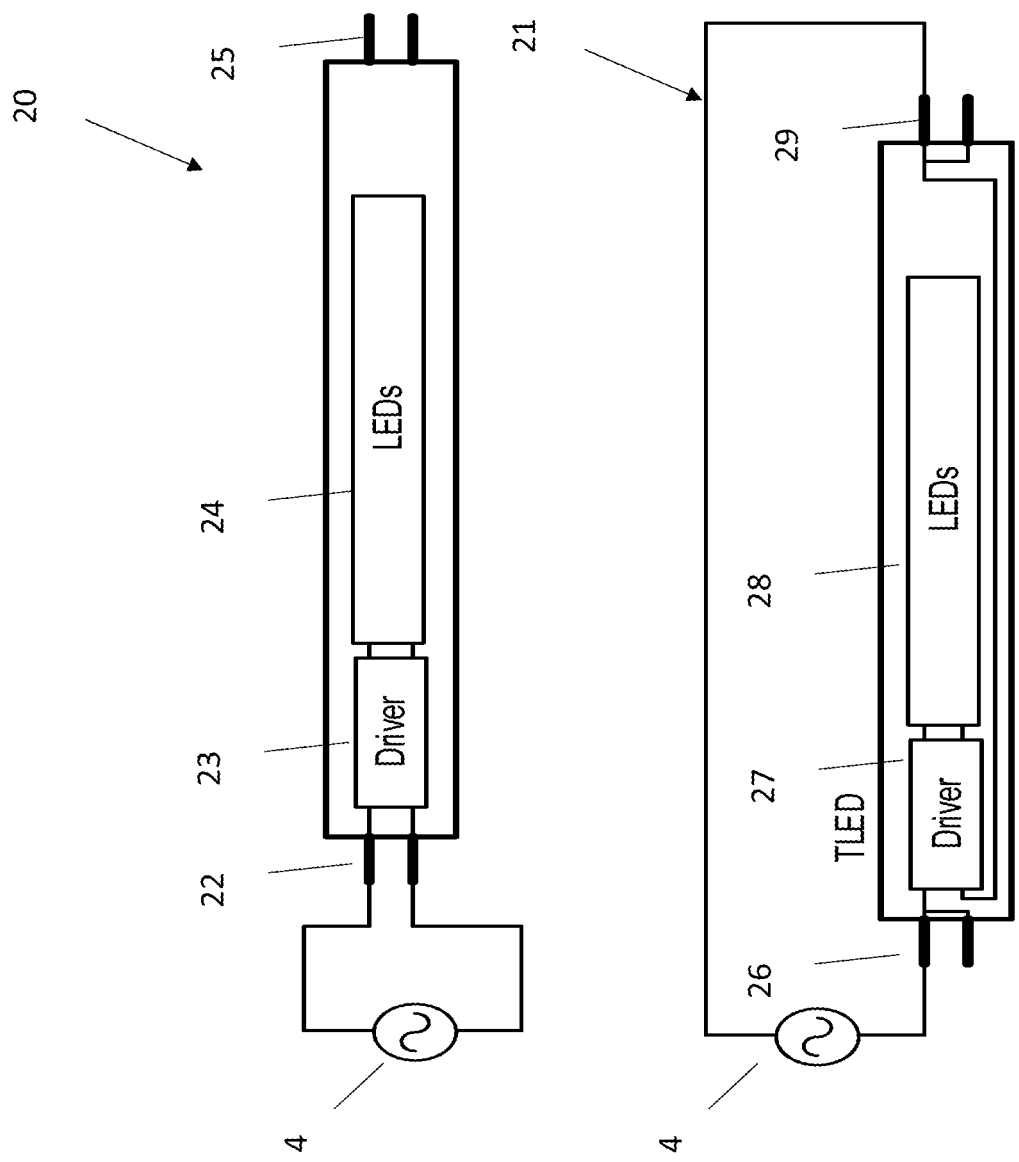
FIG. 2 schematically illustrates single ended and double ended tubes known according to the prior art.

FIG. 2 schematically illustrates single ended 20 and double ended tubes 21 known according to the prior art. Since the TLED has four input terminals, there are two major input schemes in the market: single-ended 20 and double-ended 21. The double-ended input scheme is unsafe unless pin safety measures are taken inside the lamp. The single ended tube 60 comprises of a two sets of terminals 22, 25. The internal components such as the driver 23 and the Light Emitting Diode, LED, array, 24 are connected only to one set of terminals 22.

Therefore, a disadvantage of the single-ended input is that an installer needs to note which one of the two sets of terminals 22, 25 shall be connected to mains 4, and then install the lamp accordingly. If the lamp is wrongly installed, the lamp will not light up.

To address this issue, the single-ended input tubes may be made orientation independent by adding a jumper wire, not shown. In this way the lamp will just work either way of installing. However, adding a jumper wire adds cost.

It is evident from reference numeral 21 that a double ended tube can work irrespective of the orientation in which it is installed, since both sets of terminals 26, 29 are internally shorted and are connected to the internal components such as the driver 27 and LED array 28. However, during installation, if, for example, terminal 26 in inserted first, a person coming into contact with terminals 29 is at a risk of getting an electrical shock since the other end 29 is not electrically isolated from the first end 26.

Figure 3:
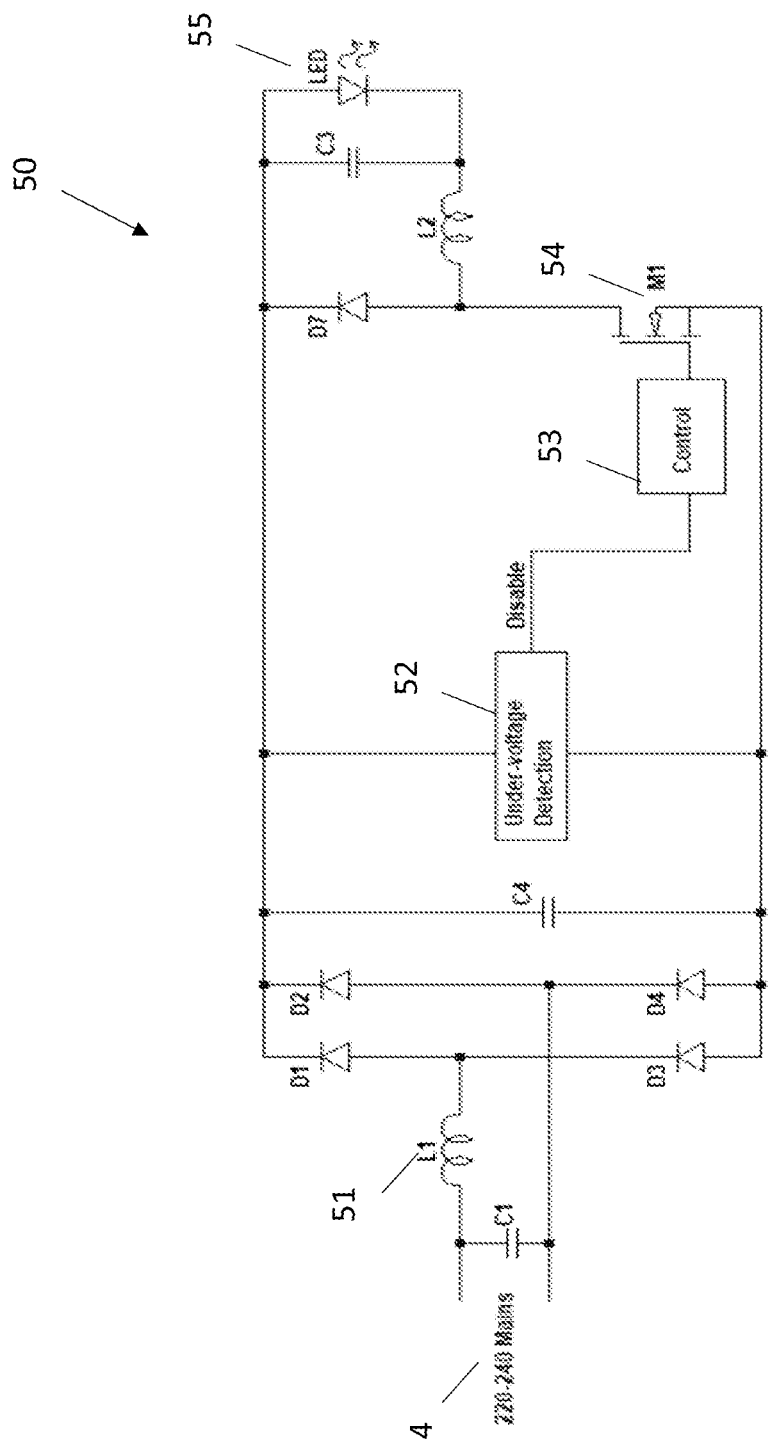
FIG. 3 illustrates an embodiment according to the present disclosure.

FIG. 3 illustrates an embodiment according to the present disclosure. Reference number 50 indicates an electrical circuit diagram for a tube according to the present disclosure. The tube is designed to operate when connected to an AC mains power supply. The tube may, further be connected through a ballast 51 to the mains 9 not shown in FIG. 3). The tube typically contains an EMI filter comprising an inductance L1 51 and a capacitance C1. Together, the elements D1-D4, capacitor C4 and the switching mode power supply comprising a switch M1 (54), an inductor L2, and a diode D7 (shown as an example in FIG. 3 is a buck converter) represent a driver designed to receive an input AC voltage from the mains power supply 4 and provide a suitable DC current to the LED array 55.

LED drivers are usually designed to operate in a certain input range while maintain a constant output current via a feedback loop. When the input voltage reduces the lamp impedance drops in order to maintain a constant output. When the input voltage further drops the circuit losses regulation and the output current decreases as well. When drop even further the circuit stops working. Based on the choice of the control scheme and power stage components, typically the driver can operate down to 130V or even lower while designed for 220-240V mains input. Such a lamp is unsafe when pins are touched because the lamp can still work at reduced input voltage, causing high leakage current though the human body.

In order to effectively detect such situations of under voltage, this disclosure proposes the introduction of an under-voltage detection element 52 which measures the input voltage of the tube. This measurement may be done via the rectified mains voltage as shown in FIG. 3, which reflects the amplitude of the input AC voltage. If the input voltage is deemed to be low, a disable signal is transmitted by the under-voltage detection element 52 to a control element 53. The control element 53, may in turn, introduce a high impedance in the return path, thereby preventing the possibility of an electrical shock to the person installing the tube.

The high impedance may be introduced by, for example, controlling a MOSFET 54. For example, the MOSFET 54 is switched to an OFF state when an under voltage is detected by the under-voltage detection element 52, thereby eliminating a return path such that the person installing the tube will not get an electric shock. The person skilled in the art understands that it may not be necessary to switch the MOSFET 54 into an OFF state. Instead, it may be sufficient to control the duty cycle of the MOSFET 54 such that an effective impedance is introduced in the circuit so that the leakage current is at an acceptable value. According to defined standards, leakage currents of up to 30 mA are permissible and will not cause harm to a human even after sustained exposure.

Figure 4:
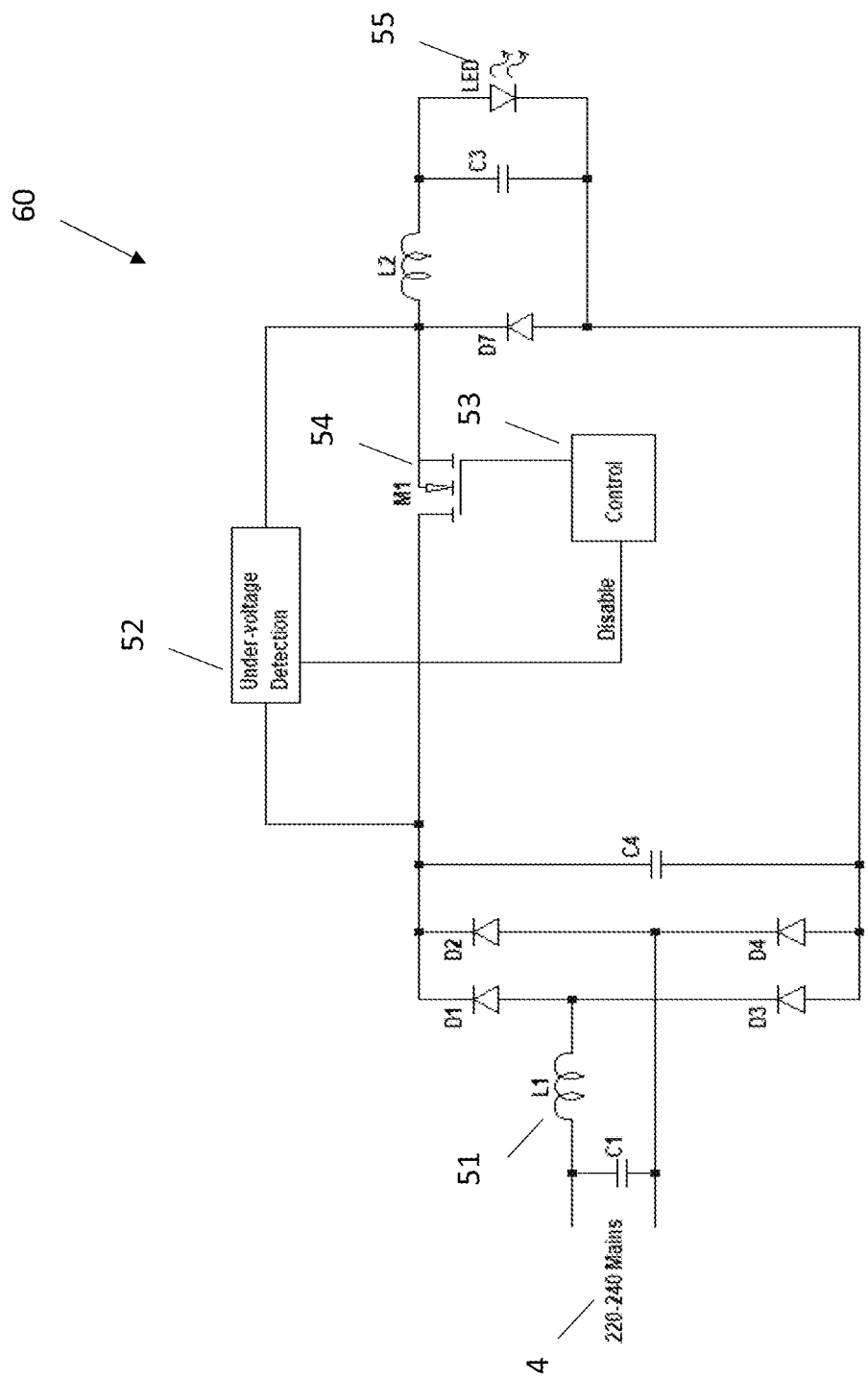
FIG. 4 illustrates an embodiment according to the present disclosure.

FIG. 4 illustrates an embodiment 60 according to the present disclosure. Under-voltage detection can be implemented easily by sensing the voltage rectified mains voltage with a resistive deliver and averaging circuit. In case of floating buck circuit as shown in FIG. 4, this can be the voltage across the power MOSFET 54.

The said switch can be the main power switch of the driver circuit (for example the power MOSFET of a buck circuit as shown in FIG. 3 and FIG. 4). In this way. No additional switch is needed to implement this protection and thus achieving a low cost.

A major advantage of the present disclosure is that it may easily be implemented in tubes commercially available in the market without the need to physically modify them or introducing additional elements. The circuit may be, for example, integrated in the driver control Integrated Circuit, IC.

Figure 5:
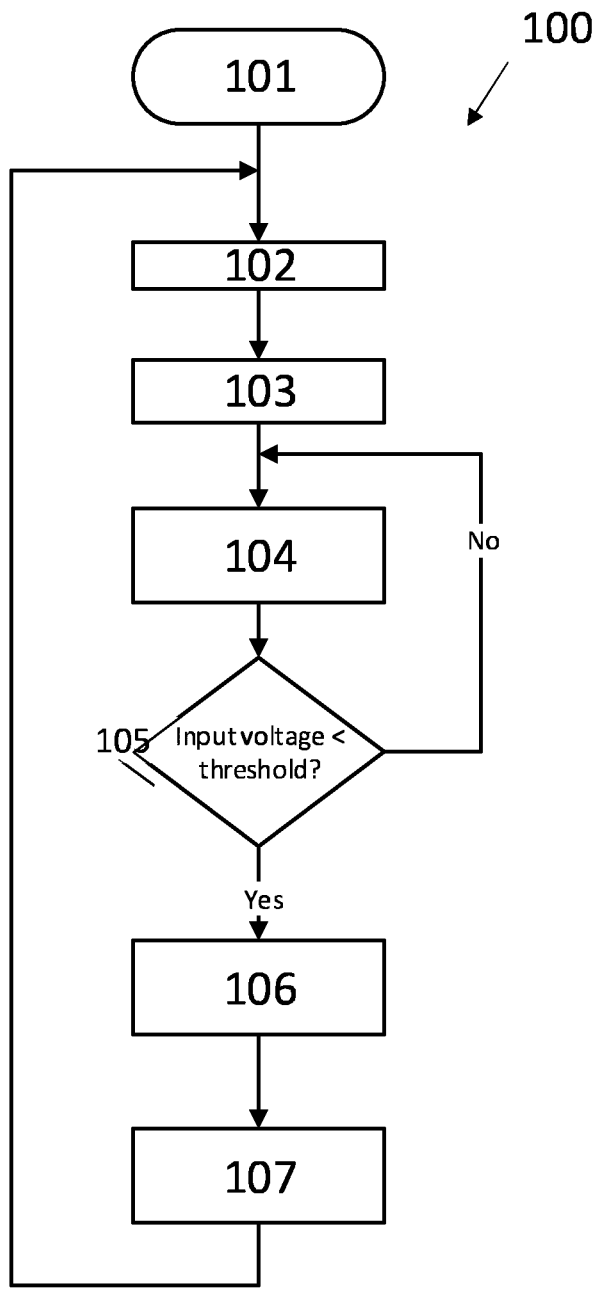
FIG. 5 illustrates a method according to the present disclosure.

FIG. 5 illustrates a method 100 according to the present disclosure. In a first step 101, the driver and other elements are powered up. This may be as a result of normal operation or due to the passing of leakage current through the tube. The under voltage protection comprising of the under voltage detection element, 52, controller 53 and the MOSFET 54 are initially disabled in a step 102. This ensures normal operation 103 of the tube.

The under voltage detection element 52 detects 104 the amplitude of the input voltage. If the detected amplitude is lower 105 than a predetermined threshold, the driver is disabled 106 by introducing a high impedance in the return path or switching OFF the MOSFET 54, for example. Additionally, protection may be latched for a certain amount of time in order to ensure safety. If, however, it is determined that in step 105, the input voltage is greater than the predetermined threshold, normal operation may continue.

Once the driver circuit is disabled, it is maintained in a disabled mode until the latch protection ensues and the under voltage protection circuit is reset 107. The steps 102-107 are repeated during a period of normal operation of the lamp.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A double ended retrofit Light Emitting Diode, LED, based lighting device for preventing an excess of leakage current during installation of said lighting device, said lighting device comprising:
    an LED load arranged for emitting light;
    an LED driver arranged for receiving an Alternating Current, AC, mains voltage between at least two terminals and for driving said LED load by providing an LED output current to said LED load, and a Direct Current, DC, Voltage to said LED load; and
    an under-voltage protection circuit, arranged for measuring a rectified mains voltage during operation of the LED driver and for providing a high ohmic return path between said at least two terminals to ensure that no unsafe situations occur with the retrofit LED lighting device when said measured voltage is lower than a predetermined threshold,
    wherein said LED driver is arranged to provide a constant LED output current to said LED load when said AC mains voltage is between an upper limit and a lower limit, wherein said predetermined threshold for said under-voltage protection circuit is lower than said lower limit.

2. The lighting device according to claim 1, wherein said lower predetermined threshold is 20% lower than said upper limit.

3. The lighting device according claim 1, wherein said retrofit LED based lighting device further comprises a switch, wherein said switch is connected such that a return path is established between said at least two terminals when said switch is in an ON state, and such that a return path is interrupted between said at least two terminals when said switch is in an OFF state, wherein said under-voltage protection circuit is arranged for switching said switch to said OFF state when said measured voltage is lower than said predetermined threshold.

4. The lighting device in accordance with claim 3, wherein said switch is a Metal Oxide Semiconductor, MOS, Field Effect Transistor, FET.

5. The lighting device according to claim 1, wherein said lighting device comprises four terminals for receiving said AC mains voltage, wherein two of said four terminals are provided at a first end face of said lighting device, and wherein another two of said four terminals are provided at a second end face of said lighting device, said second end face being opposite to said first end face.

6. A method of preventing leakage current during installation of a double ended retrofit Light Emitting Diode, LED, based lighting device in accordance with claim 1, wherein said method comprising the steps of:
    powering up the LED driver and other elements;
    measuring, by an under-voltage detection element, said DC voltage;
    determining, by said under-voltage detection element, that said measured DC voltage is below a pre-determined threshold;
    providing, by said under-voltage detection element, a high ohmic path between said at least two terminals for preventing said leakage current and to ensure that no unsafe situations occur with the retrofit LED lighting device; and
    providing a constant LED output current to said LED load when said AC mains voltage is between an upper limit and a lower limit, wherein said predetermined threshold for said under-voltage protection circuit is lower than said lower limit.

7. The method in accordance with claim 6, wherein said LED driver is arranged to provide a constant LED output current to said LED load when said supply voltage is between an upper limit and a lower limit, wherein said predetermined threshold for said under-voltage protection circuit is lower than said lower limit.

8. The method in accordance with claim 7, wherein said lower predetermined threshold is 20% lower than said lower limit.

9. The method in accordance with claim 6, wherein said retrofit LED based lighting device further comprises a switch, wherein said switch is connected such that a return path is established between said at least two terminals when said switch is in an ON state, and such that a return path is interrupted between said at least two terminals when said switch is in an OFF state, wherein said step of providing further comprises:
    providing, by said under-voltage protection circuit, a high ohmic path by switching said switch to said OFF state when said measured voltage is lower than said predetermined threshold.

10. The method in accordance with claim 9, wherein said switch is a Metal Oxide Semiconductor, MOS, Field Effect Transistor, FET.

11. The method in accordance with claim 9, wherein said switch is the same switch as comprised by said LED driver for driving said LED load.

12. The method in accordance with claim 6, wherein said lighting device comprises four terminals for receiving said AC mains voltage, wherein two of said four terminals are provided at a first end face of said lighting device, and wherein another two of said four terminals are provided at a second end face of said lighting device, said second end face being opposite to said first end face.

13. A computer program product comprising a computer readable medium having instructions which, when implemented by a double ended retrofit Light Emitting Diode, LED, based lighting device, cause said LED lighting device to perform a method in accordance with claim 6.

* * * * *